United States Patent
Wang et al.

(10) Patent No.: US 10,078,790 B2
(45) Date of Patent: Sep. 18, 2018

(54) SYSTEMS FOR GENERATING PARKING MAPS AND METHODS THEREOF

(71) Applicant: HONDA MOTOR CO., LTD., Tokyo (JP)

(72) Inventors: Chien-Yi Wang, Sunnyvale, CA (US); Yi-Ting Chen, Sunnyvale, CA (US); Behzad Dariush, San Ramon, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 15/435,096

(22) Filed: Feb. 16, 2017

(65) Prior Publication Data

US 2018/0232583 A1   Aug. 16, 2018

(51) Int. Cl.
| | |
|---|---|
| *G06K 9/00* | (2006.01) |
| *G06K 9/62* | (2006.01) |
| *G06T 7/73* | (2017.01) |
| *B60R 11/04* | (2006.01) |
| *G08G 1/14* | (2006.01) |

(52) U.S. Cl.
CPC ......... *G06K 9/00812* (2013.01); *B60R 11/04* (2013.01); *G06K 9/628* (2013.01); *G06K 9/6218* (2013.01); *G06K 9/6248* (2013.01); *G06K 9/6256* (2013.01); *G06K 9/6277* (2013.01); *G06T 7/73* (2017.01); *G08G 1/143* (2013.01); *G06T 2207/10028* (2013.01); *G06T 2207/20081* (2013.01); *G06T 2207/30264* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 8,558,679 B2 | 10/2013 | Bargman et al. | |
| 9,097,800 B1 | 8/2015 | Zhu | |
| 9,969,386 B1 * | 5/2018 | Wang ................. | B60W 30/06 |
| 2010/0020074 A1 | 1/2010 | Taborowski et al. | |
| 2013/0046430 A1 | 2/2013 | Bageshwar | |
| 2013/0057686 A1 | 3/2013 | Genc et al. | |

(Continued)

FOREIGN PATENT DOCUMENTS

| | | |
|---|---|---|
| CN | 102938064 A | 2/2013 |
| CN | 104865578 A | 8/2015 |

OTHER PUBLICATIONS

Azim, A., et al., "Detection, Classification and Tracking of Moving Objects in a 3D Environment."

(Continued)

*Primary Examiner* — Sumati Lefkowitz
*Assistant Examiner* — David Perlman
(74) *Attorney, Agent, or Firm* — Arent Fox LLP

(57) ABSTRACT

A parking map generated based on determining a plurality of object clusters by associating pixels from an image with points from a point cloud. At least a portion of the plurality of object clusters can be classified into one of a plurality of object classifications including at least a vehicle object classification. A bounding box for one or more of the plurality of object clusters classified as the vehicle object classification can be generated. The bounding box can be included as a parking space on a parking map based on a location associated with the image and/or point cloud.

18 Claims, 13 Drawing Sheets

(56) References Cited

U.S. PATENT DOCUMENTS

| | | | |
|---|---|---|---|
| 2015/0001303 A1* | 1/2015 | Adams, Jr. | G06K 9/4604 |
| | | | 235/462.08 |
| 2015/0025788 A1 | 1/2015 | Crain et al. | |
| 2015/0268058 A1 | 9/2015 | Samarasekera et al. | |
| 2015/0324658 A1 | 11/2015 | Zhang et al. | |
| 2015/0344028 A1 | 12/2015 | Gieseke et al. | |
| 2016/0035081 A1 | 2/2016 | Stout et al. | |
| 2016/0054452 A1 | 2/2016 | Cosatto et al. | |
| 2016/0125736 A1 | 5/2016 | Shaik | |
| 2016/0209846 A1 | 7/2016 | Eustice et al. | |
| 2016/0378104 A1* | 12/2016 | Hiei | B60Q 9/00 |
| | | | 701/2 |
| 2018/0136332 A1* | 5/2018 | Barfield, Jr. | G01S 17/42 |

OTHER PUBLICATIONS

Kent, L., "HERE introduces HD maps for highly automated vehicle testing," http://360.here.com, Jul. 20, 2015.

Mohottala, S., et al., "Fusion of a Camera and a Laser Range Sensor for Vehicle Recognition," IEEE, pp. 16-23, 2009.

Zhang, F., et al., "Vehicle Detection Based on LiDAR and Camera Fusion," 2014 IEEE 17th International Conference on Intelligent Transportation Systems (ITSC), pp. 1620-1625, Oct. 8-11, 2014, Qingdao, China.

\* cited by examiner

SYSTEMS FOR GENERATING PARKING MAPS AND METHODS THEREOF

BACKGROUND

Vehicle parking in large cities can be problematic due to the density of population of drivers, drivers not knowing locations of parking spaces and/or parking lots throughout the city, drivers not knowing whether parking spaces are available or occupied, etc. Some on-street parking systems include static sensors (e.g., magnetometer, infrared, or radar) on the ground or the parking lot to detect whether or not parking spaces are occupied by vehicles. These systems, however, are not very scalable for providing to other vehicles information such as parking space location or whether the parking spaces are available or occupied. Also, these systems are not easy to dynamically update when additional of parking spaces/lots become available. Other parking availability systems include crowd-sourcing where multiple traffic participants collect and share data on availability of on-street parking spaces. There are yet other systems that detect parking space availability at parking lots by utilizing beacons between a mobile phone on a test vehicle and a WiFi station to determine whether a driver has entered or driven away from the parking lot. Such systems, however, require a manually provided (e.g., uploaded) parking map for indicating parking space locations that the system can use in determining parking space availability. This parking map may not be easily provided to other systems and/or may not be easily updated to include additional parking spaces.

SUMMARY

The following presents a summary of one or more aspects of the disclosure in order to provide a basic understanding of such aspects. This summary is not an extensive overview of all contemplated aspects, and is neither intended to identify key or critical elements of all aspects nor delineate the scope of any or all aspects. Its sole purpose is to present some concepts of one or more aspects of the disclosure in a simplified form as a prelude to the more detailed description that is presented later.

In an example, a method of generating a parking map is provided. The method can include obtaining, via a camera, an image acquired at a location, obtaining, via a light detector, a point cloud acquired at a second location, which is within a threshold distance of the location, and determining a plurality of object clusters based at least in part on associating pixels from the image with points from the point cloud. The method can also include classifying at least a portion of the plurality of object clusters into one of a plurality of object classifications including at least a vehicle object classification, generating a bounding box for one or more of the plurality of object clusters classified as the vehicle object classification, and including the bounding box as a parking space on a parking map based on at least one of the location or the second location.

In another example, a vehicle is provided that includes a camera for capturing one or more images, a light detector for capturing one or more point clouds, a memory coupled to the camera and the light detector for storing the one or more images and the one or more point clouds, and at least one processor coupled to the memory. The at least one processor is configured to obtain, via the camera, an image acquired at a location, obtain, via the light detector, a point cloud acquired at a second location, which is within a threshold distance of the location, determine a plurality of object clusters based at least in part on associating pixels from the image with points from the point cloud, classify at least a portion of the plurality of object clusters into one of a plurality of object classifications including at least a vehicle object classification, generate a bounding box for one or more of the plurality of object clusters classified as the vehicle object classification, and include the bounding box as a parking space on a parking map based on at least one of the location or the second location.

In a further example, a non-transitory computer-readable medium storing computer executable code for generating a parking map is provided. The code includes code for obtaining, via a camera, an image acquired at a location, obtaining, via a light detector, a point cloud acquired at a second location, which is within a threshold distance of the location, determining a plurality of object clusters based at least in part on associating pixels from the image with points from the point cloud, classifying at least a portion of the plurality of object clusters into one of a plurality of object classifications including at least a vehicle object classification, generating a bounding box for one or more of the plurality of object clusters classified as the vehicle object classification, and including the bounding box as a parking space on a parking map based on at least one of the location or the second location.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
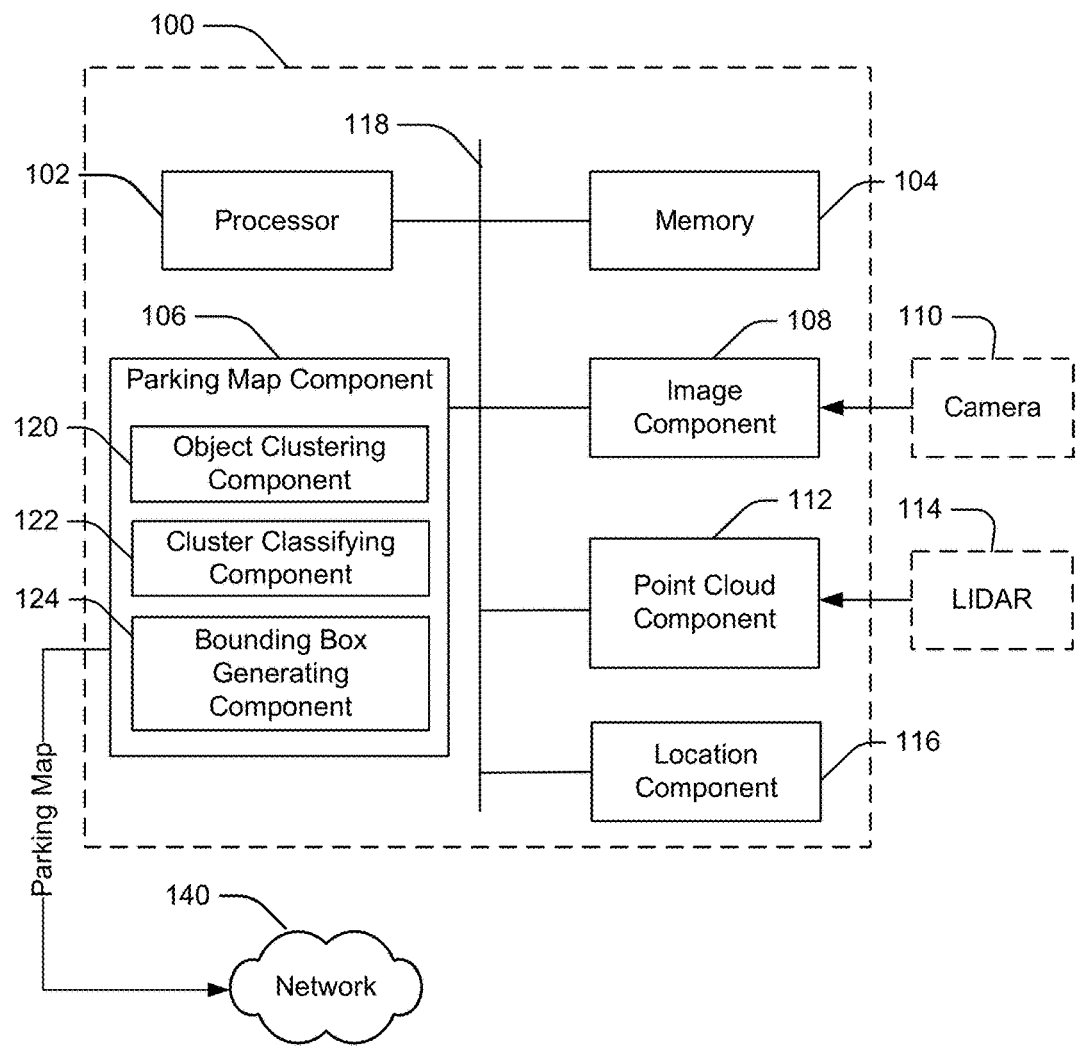
FIG. 1 illustrates a schematic view of an example of a system for generating a parking map according to one aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Parking maps for indicating parking spaces can be generated using input from a plurality of input sources, such as an image input (e.g., from a camera) and a light sensor input (e.g., from a light detection and ranging (LIDAR) device), among other input sources. For example, the plurality of input sources can be calibrated to capture input and/or associate captured input to similar points in time, location, etc., such that the input can be analyzed together in generating a parking map. In a specific example, a testing device, such as a vehicle, can be equipped with a camera and a LIDAR device, and can capture images and point clouds as the vehicle moves along a route. The images and point clouds can be analyzed together to detect parking spaces along the route. For example, the images and point clouds can be analyzed to detect parked vehicles in areas along the route that are determined to correspond to parking spaces. Bounding boxes can be generated for the parked vehicles to define a parking space (e.g., which can include defining a location and/or an orientation of the parking space), which can be included in generating the parking map. Accordingly, the parking map with the bounding boxes can be displayed on a navigation system of a vehicle (or other computing device) or otherwise be used in additionally determining whether the parking spaces are occupied or vacant (which can also be displayed using one or more indicators on a navigation system of the vehicle or other computing device). For example, the parking map can be a map at varying level of detail, a map layer of bounding boxes and/or other indicators for displaying over a three-dimensional (3D) or high definition (HD) map, and/or the like. Additionally, for example, the process can be performed multiple times to modify or refine bounding boxes to account for vehicles that may not be perfectly aligned with the parking space, to locate additional parking spaces, etc.

For example, using images from a camera alone to capture the scene and determine parking spaces may not be desirable as it may be difficult to determine accurate location and orientation of the parking spaces (or corresponding parked vehicles). Moreover, using point clouds from LIDAR alone may not be desirable as it may be difficult to accurately identify vehicles in the point clouds. Fusing the two inputs (and/or additional inputs), however, can improve detectability of the parked vehicles, and thus of the parking space locations by using the images to recognize the vehicle objects and using the point clouds to more accurately identify location and/or orientation of the vehicle objects.

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, system-on-a-chip (SoC), and other suitable hardware configured to perform the various functionality described herein.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example of a system 100 for generating parking maps in accordance with aspects described herein. Components of the system 100, as well as the components of other systems, hardware architectures and software architectures discussed herein, can be combined, omitted or organized into different architectures for various aspects of the disclosure. However, the example aspects and configurations discussed herein focus on the system 100 as illustrated in FIG. 1, with corresponding system components and related methods.

As shown in FIG. 1, system 100 can include or be operably coupled with (or executed by) one or more processors 102 and one or more memories 104 that communicate to effectuate certain actions described herein. For example, the one or more processors 102 and/or one or more memories 104 may execute, and/or store instructions, parameters, etc., for executing, a parking map component 106 for generating a parking map, an image component 108 for receiving one or more images (e.g., from a camera 110), a point cloud component 112 for receiving one or more point clouds (e.g., from a LIDAR 114 device), and/or a location component 116 for receiving one or more parameters related to a location of system 100 (e.g., and/or corresponding to the image and/or point cloud inputs). The processor(s) 102, memory(ies) 104, various ones of the components 106, 108, 112, 116, etc. may be operatively coupled via a bus 118. In another example, processor(s) 102 may execute one or more of the various components 106, 108, 112, 116 to perform functions described herein, while being operatively coupled to the memory(ies) 104 and/or other components via the bus 118.

In an example, parking map component 106 may include an object clustering component 120 for detecting object clusters in an image and/or point cloud input, a cluster classifying component 122 for classifying the detected object clusters (e.g., at least as a vehicle object classification), and/or a bounding box generating component 124 for generating a bounding box corresponding to object clusters detected as a vehicle object classification, where the bounding box can be associated with a location for including on a parking map and/or an associated parking map layer.

In an example, system 100 may be employed, in full or in part, within a vehicle traveling a route. In another example, system 100 may be distributed between a vehicle and one or more remote devices (e.g., camera 110 and LIDAR 114 may be present on the vehicle, while one or more components, such as parking map component 106, may be distributed on one or more remotely located computers). In this regard, for example, processing of input from camera 110, LIDAR 114, etc. may occur on the vehicle or at a remotely located device for generating the parking map. In an example, in either case, parking map component 106 can provide the parking map and/or associating parameters (e.g., bounding box location, sizing, etc.) to one or more other devices via a network 140 for displaying and/or further processing.

In an example, a vehicle equipped with the same system 100 or a different system may obtain the generated parking map, and may travel a similar route to determine parking space availability of parking spaces based on the parking map. In an example, such a vehicle may utilize a single input (e.g., a camera, a LIDAR, manual user input, or other detection device) along with the parking map to determine whether the parking spaces on the parking map are occupied. For example, the level of detail for determining whether the parking space is occupied may not be as complex as that used in detecting the parking space for producing the parking map, and thus a lesser number of input devices may be used for determining parking availability. In another example, a vehicle can send a report to a remote device when vacating a parking space, for updating the availability information. In either case, in an example, crowd-sourcing may be used by providing the parking map to many user-operated vehicles, which may be equipped with systems for determining whether and/or when parking spaces identified in the parking map become occupied and/or available.

Figure 2:
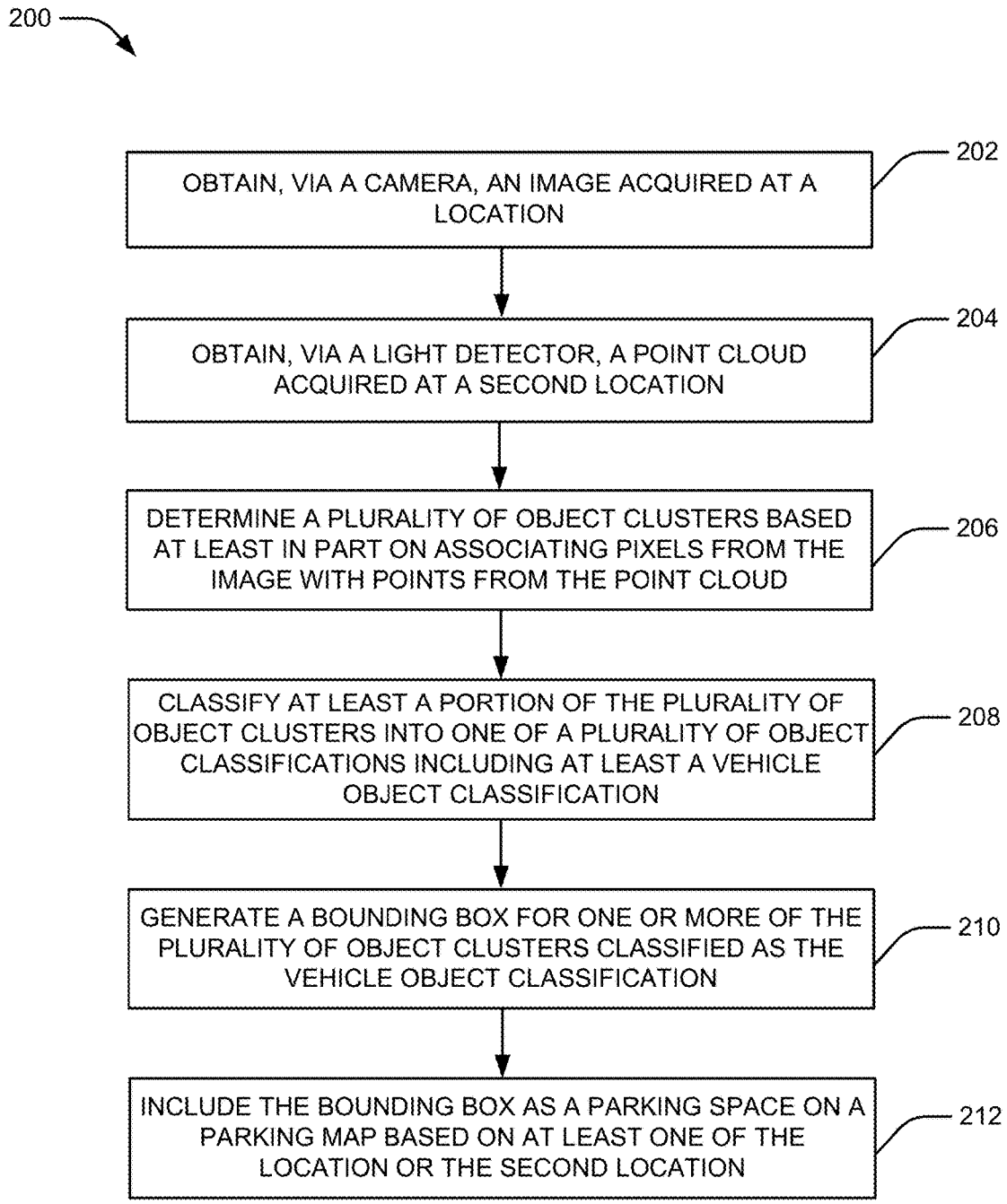
FIGS. 2-4 illustrate a flowchart showing an example method for generating a parking map according to one aspect of the disclosure.

Referring now to FIG. 2, which is described in conjunction with the example system 100 of FIG. 1, an example method 200 for generating a parking map is illustrated. For example, method 200 may be performed by one or more processors 102 and/or memories 104 of a system 100, which may be located in a vehicle, distributed at various locations, etc., as described above. In this regard, one or more blocks may be performed (e.g., in full or in part) on a vehicle, at a remote location, etc., for generating the parking map.

In block 202, the method 200 can include obtaining, via a camera, an image acquired at a location. In an aspect, image component 108 can obtain, via the camera (e.g., camera 110), the image acquired at the location. For example, camera 110 may be positioned on a vehicle traveling along a route, and the camera 110 can be configured to periodically capture images and/or to capture video at a certain number of frames per second (FPS). The camera 110 may store the images/video locally and/or in memory(ies) 104, and/or can provide the images/video to a remote device, from which the image component 108 may receive the image. In addition, for example, location component 116 may determine a location associated with the image, which may include obtaining global positioning system (GPS) coordinates of a vehicle that includes the camera 110 at or near the time at which the image is captured by the camera 110. In an example, location component 116 can associate the GPS coordinates with the image (e.g., in image metadata or otherwise in relational storage) such that the location can be determined for the image when processing the image to generate the parking map.

In block 204, the method 200 can include obtaining, via a light detector, a point cloud acquired at a second location. In an aspect, point cloud component 112 can obtain, via the light detector (e.g., LIDAR 114), the point cloud acquired at the second location. For example, LIDAR 114 may be positioned on a vehicle traveling along a route, and the LIDAR 114 can be configured to periodically capture point cloud scans of an area along the route. The LIDAR 114 may store the point clouds locally and/or in memory(ies) 104, and/or can provide the point clouds to a remote device, from which the point cloud component 112 may receive the point clouds. In addition, for example, location component 116 may determine a location associated with the point clouds, which may include obtaining global positioning system (GPS) coordinates of a vehicle that includes the LIDAR 114 at or near the time at which at least a portion of the point cloud is captured by the LIDAR 114. In an example, location component 116 can associate the GPS coordinates with the point clouds (e.g., in point cloud metadata or otherwise in relational storage) such that the location can be determined for the point cloud when processing the point cloud to generate the parking map.

In one example, location component 116 may associate the images and point clouds captured at a similar point in time with one another and/or with the corresponding location. In addition, as described further herein, parking map component 106 can obtain the image and point cloud inputs, which may be synchronized based on an associated point in time at which capturing of the image and point cloud occurred, synchronized based on the associated location, etc., and may use the multiple inputs as multiple modalities for determining size, location, orientation, etc., of vehicles detected in the image and/or point cloud to define bounding boxes for parking spaces. Moreover, parking map component 106 can associate the bounding boxes with additional location information (e.g., GPS coordinates) to construct a three-dimensional parking map and/or a parking layer for overlaying on a three-dimensional map.

In block 206, the method 200 can include determining a plurality of object clusters based at least in part on associating pixels from the image with points from the point cloud. In an aspect, object clustering component 120 can determine the plurality of object clusters based at least in part on associating pixels from the image with points from the point cloud. For example, object clustering component 120 may determine pixels of the image that correspond to points in the point cloud, and can accordingly determine which pixels and/or points correspond to a single object. Object clustering component 120 can determine the object clusters using a variety of different processes. Some non-limiting examples are provided below, and described with respect to FIG. 3.

Figure 3:
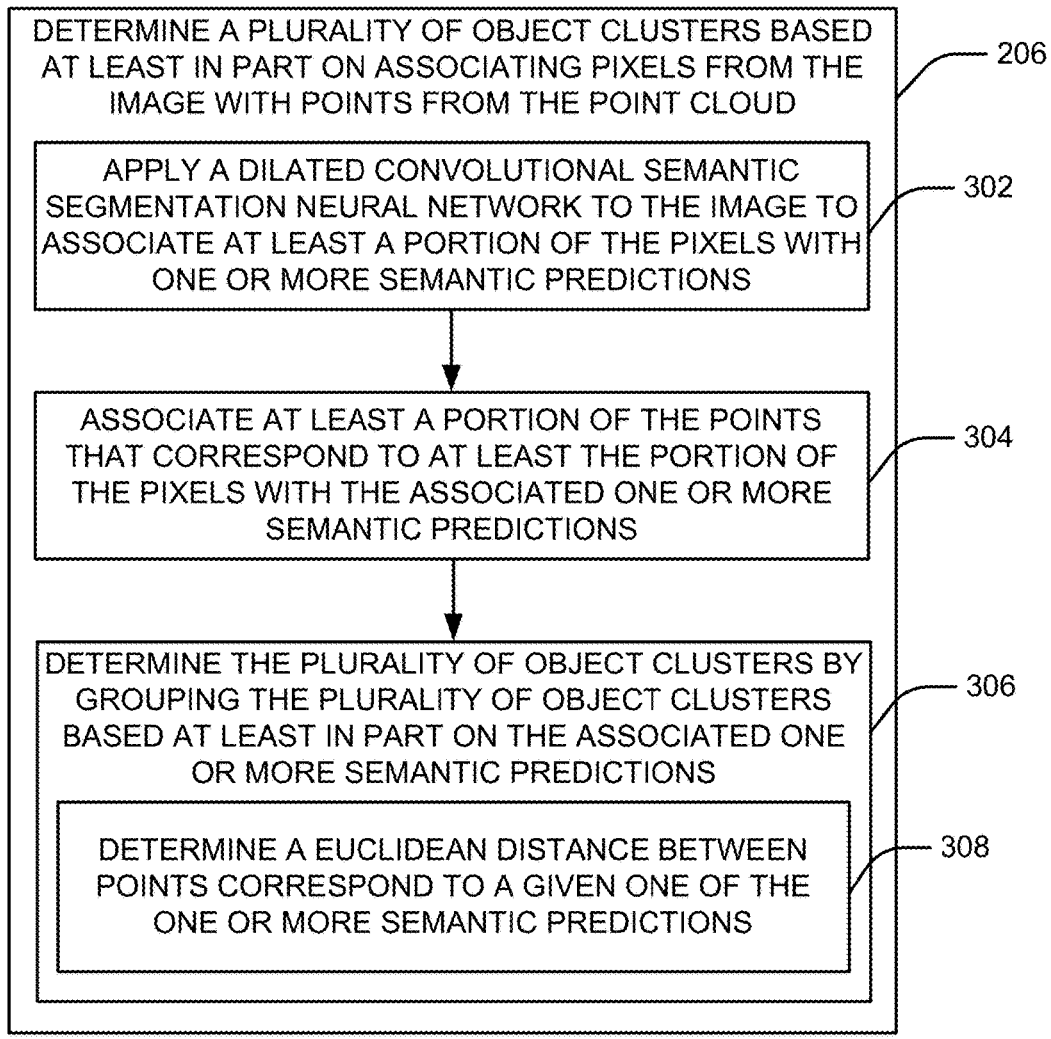

FIG. 3 illustrates an example of determining a plurality of object clusters in block 206. For example, determining the plurality of object clusters in block 206 may include, in block 302, applying a dilated convolutional semantic segmentation neural network to the image to associate at least a portion of the pixels with one or more semantic predictions. In an aspect, object clustering component 120 can apply the dilated convolutional semantic segmentation neural network (e.g., a dilated convolutional neural network (CNN)) to the image to associate at least the portion of the pixels with one or more semantic predictions. Object recognition may be more accurate in the image domain (e.g., as opposed to the point cloud domain) based on a more accurate pictorial representation of the scene. Accordingly, object clustering component 120 can apply the dilated convolution semantic segmentation neural network to the image to output a dense pixel-wise semantic categories prediction. For example, the output from applying the CNN can appear to have similar shapes and outlines as the image where color values for the pixels are replaced with color values that correspond to a detected object based on object definitions in the CNN. Thus, for example, a semantic category corresponding to a group of pixels can be determined based on the pixel color value, and certain sizing parameters of the object may be determined or inferred based on a number of neighboring pixels corresponding to the pixel color value in a given direction.

For example, the semantic categories may include road, sky, sidewalk, plant, person, vehicle, and building, among other categories. In an example, object clustering component 120 can determine the semantic categories, which may not be accurate on a boundary of the object in the image, which can be due in part to uncertainty as to whether the edge pixels are part of the object due to information in the CNN. Moreover, for example, applying the CNN may result in semantic categorization that is not instance specific (e.g., multiple objects having the same semantic category can be associated with the same pixel values).

For example, determining the plurality of object clusters in block 206 may also include, in block 304, associating at least a portion of the points that correspond to at least the portion of the pixels with the associated one or more semantic predictions. In an aspect, object clustering component 120 can associate at least the portion of the points that correspond to at least the portion of the pixels with the associated one or more semantic predictions. In an example, object clustering component 120 may apply a calibration between the image and point cloud input to account for a difference the image and point cloud inputs, which may be caused by the nature of capturing images and point clouds via a camera 110 and LIDAR 114, respectively, positioning of the camera 110 and/or LIDAR 114 respective to one another, focus or zoom of the camera 110, etc. In any case, for example, the coordinate systems between the camera 110 and LIDAR 114 may differ for a given image and associated point cloud.

Thus, for example, object clustering component 120 may apply a calibration matrix $A_{3 \times 4}$, which can be a product of the intrinsic matrix of the camera 110 and the extrinsic transformation matrix from the LIDAR 114 to the camera 110, to determine pixels that are associated to certain points in the point cloud. In this example, given a point [x,y,z] in the point cloud coordinate system, the corresponding pixel coordinate [u',v'] can be determined based on the following:

$$[u,v,w]^T = A_{3 \times 4} \cdot [x,y,z,1]^T$$

$$u' = u/w$$

$$v' = v/w \quad (1)$$

Using equation (1) and the semantic predicted image, for example, the semantic predictions can be transferred into the front view of the point cloud to obtain a sematic point cloud where each point in the semantic point cloud includes a three dimensional coordinate, and a semantic prediction corresponding to the determined pixel.

For example, determining the plurality of object clusters in block 206 may also include, in block 306, determining the plurality of object clusters by grouping the plurality of object clusters based at least in part on the associated one or more semantic predictions. In an aspect, object clustering component 120 can determine the plurality of object clusters by grouping the plurality of object clusters based at least in part on the associated one or more semantic predictions in the semantic point cloud. For example, object clustering component 120 may remove, ignore, or otherwise avoid points in the point cloud that are determined to be ground. For example, object clustering component 120 may determine the ground to be the largest planar component in the point cloud. In addition, the object clustering component 120 may remove, ignore, or otherwise avoid points in the point cloud that are determined to be planar inliers until there is no large plane (e.g., a plane that is larger than a threshold point size). For example, object clustering component 120 may remove, ignore, or otherwise avoid the planar inliers using random sample consensus (RANSAC) to determine the planar inliers that achieve the threshold point size.

Additionally, for example, determining the plurality of object clusters at block 306 may include, at block 308, determining a Euclidean distance between points corresponding to a given one of the one or more semantic predictions. In an aspect, object clustering component 120 can determine a Euclidean distance between points corresponding to a given one of the one or more semantic predictions, which may include avoiding the ground and planar inliers determined as described above. In conventional object clustering only the Euclidean distance may be considered in clustering points. For example, for a given point p in a cluster c, the Euclidean distance between p and its nearest neighbor point may be denoted as $d_1$. If $d_1 \leq th$, where th is an empirical threshold parameter, the nearest neighbor point can be included in the object cluster. In an example, however, object clustering component 120 can also consider the semantic information added to the semantic point cloud, as described above, in clustering objects. Thus, for example, for a given point in the semantic point cloud, object clustering component 120 can determine a class probability vector $c=[c_1, c_2, \ldots c_n]$, where n can be a total number of semantic categories, and the sum of vector elements in c is 1. The class distance $d_2$ can be a L2 norm between two class probability vectors. For the point p in a cluster c, a nearby point that satisfies the following may be included in the object cluster: $d_1+\lambda d_2 \leq th$, where $\lambda$ can be a hyperparameter that can be set to balance effects of different class distances. Object clustering component 120 can cluster objects in the semantic point cloud in this regard until substantially all points (e.g., except the ground and/or planar inliers) are considered.

Referring again to FIG. 2, method 200 can also include, at block 208, classifying at least a portion of the plurality of object clusters into one of a plurality of object classifications including at least a vehicle object classification. In an aspect, cluster classifying component 122 can classify at least the portion of the plurality of object clusters into one of the plurality of object classifications. For example, cluster classifying component 122 can determine the object classification for an object based on the semantic prediction associated with the object and based on three-dimensional shape information of the object from the point cloud.

Figure 4:
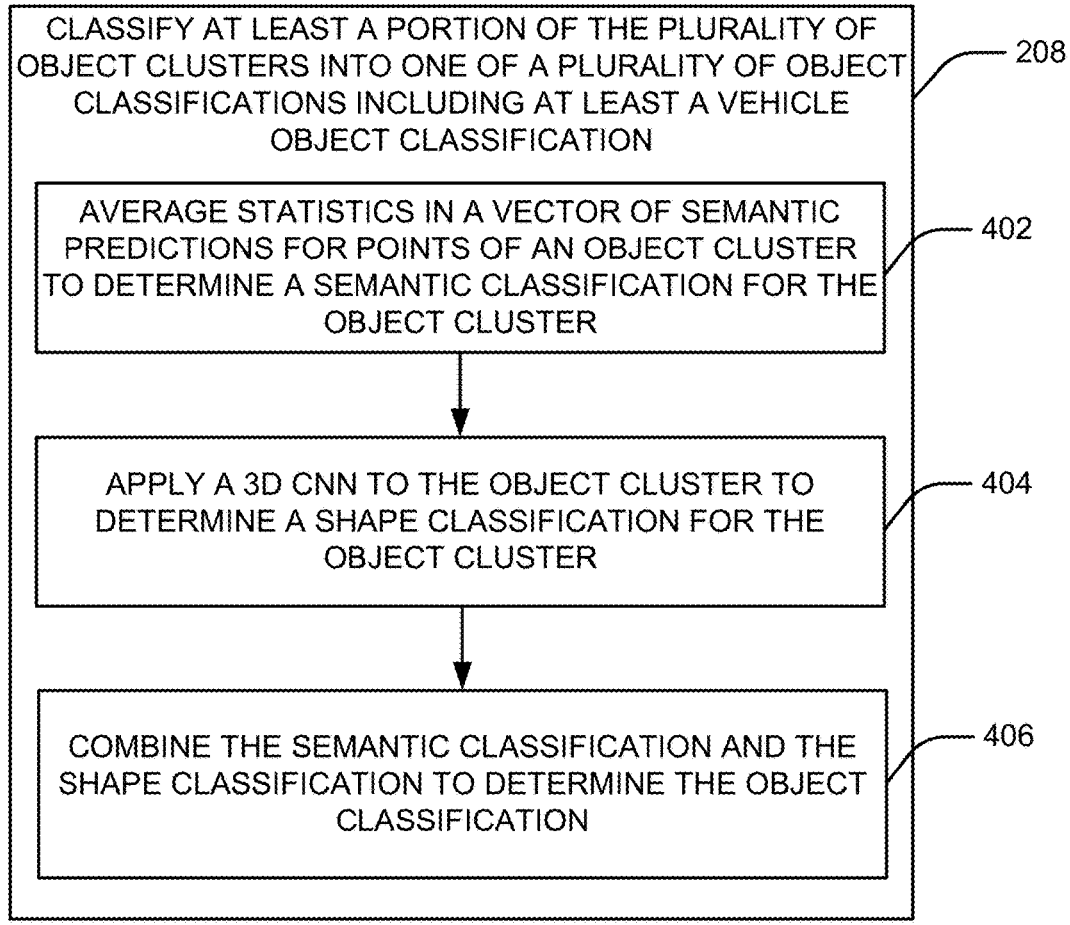

FIG. 4 illustrates an example of classifying the portion of the plurality of object clusters in block 208. For example, classifying the portion of the plurality of object clusters at block 208 may include, at block 402, averaging statistics in a vector of semantic predictions for points of an object cluster to determine a semantic classification for the object cluster. In an aspect, cluster classifying component 122 can average statistics in the vector of semantic predictions for points of an object cluster (e.g., class probability vector, c, described above) to determine a semantic classification for the object cluster. In one example, cluster classifying component 122 may obtain the class probability vector, c, for points in the point cloud, and may compute a category probability for each point in an object cluster (e.g., based on counting and averaging statistics for each category in c) to obtain the result probability $c_{semanti}$ for a given object cluster.

In addition, for example, classifying the portion of the plurality of object clusters at block 208 may include, at block 404, applying a 3D CNN to the object cluster to determine a shape classification for the object cluster. In an aspect, cluster classifying component 122 can apply the 3D CNN to the object cluster to determine the shape classification for the object cluster. For example, the 3D CNN can learn various representations for encoding geometric shapes, which can be used in attempting to automatically classifying shapes based on the 3D CNN. In a specific example, applying the 3D CNN to the object cluster may include selecting a volumetric occupancy grid corresponding to the point cloud making up the object cluster, where the grid can be stored for easier manipulation than actual points in the point cloud. Cluster classifying component 122 can process the occupancy grid through multiple layers of the 3D CNN to determine the shape classification.

In a specific example, cluster classifying component 122 can initially use a binary grid algorithm to transform object clusters into the occupancy grid. In this example, cluster classifying component 122 can then apply a 3D convolutional layer C(f, d, s), which takes four dimensional input volumes, three of which are spatial dimensions and the fourth a feature dimension. The 3D convolutional layer can apply a spatial stride, s, to convolve the input with f filters of shape d×d×d×f', where f' is the number of input features and creates f features as output. The output can be passed to a non-linear rectified linear unit (ReLU) function, which can strengthen the neural network to learn more complicated features. The cluster classifying component 122 can further apply a pooling layer pool, m, to down-sample the input volume by a factor of m along the spatial dimensions. In one example, cluster classifying component 122 can use a maximum pooling, which can replace each m×m×m block with a maximum value. The cluster classifying component 122 can then apply a fully connected layer, FC(n), which can have n output neurons connected with every neuron output in the last layer. The output can also be passed to a ReLU function and used to generate a shape classification probability, $c_{shape}$.

For example, classifying the portion of the plurality of object clusters at block 208 may include, at block 406, combining the semantic classification and the shape classification to determine the object classification. In an aspect, cluster classifying component 122 can combine the semantic classification, $c_{semantic}$, and the shape classification, $c_{shape}$, to determine the object classification for an object cluster. In an example, cluster classifying component 122 may combine the classifications with a linear weight, $\alpha$, where $\alpha \in [0,1]$. Cluster classifying component 122 can calculate a final object classification score by $c_{final}=c_{semantic} \times \alpha + c_{shape} \times (1-\alpha)$. In an example, cluster classifying component 122 may receive or otherwise determine $\alpha$ based on training data (e.g., data regarding whether previous shape classifications were successful using certain values of $\alpha$).

Referring back to FIG. 2, method 200 can also include, at block 210, generating a bounding box for one or more of the plurality of object clusters classified as the vehicle object classification. In an aspect, bounding box generating component 124 can generate the bounding box for one or more of the plurality of object clusters classified as the vehicle object classification. For example, bounding box generating component 124 can project the point cloud points corresponding to a given object cluster onto a two-dimensional plane (e.g., an x, y plane by ignoring height associated with the object cluster). Bounding box generating component 124 can then find a minimum area rectangle enclosing the points by using a rotating calipers algorithm. Additionally, bounding box generating component 124 can assign a maximum height of the points to be a height of the box, as it is assumed the vehicle object is located on the ground. The bounding box, for example, can provide a shape of the parking space, from which a location, size, orientation (e.g., as slotted, unslotted, etc., based on the orientation of the bounding box respective to another object, such as the street, another parking space, etc.), and/or the like, of the parking space can be determined.

Method 200 can also include, at block 212, including the bounding box as a parking space on a parking map based on at least one of the location or the second location. In an aspect, parking map component 106 can include the bounding box as the parking space on the parking map based on at least one of the location or the second location. For example, parking map component 106 may generate a parking map, which can be a three-dimensional map using map data for one or more locations, and can generate parking spaces corresponding to the bounding boxes based on location data associated with the bounding boxes, which can include a location (e.g., GPS coordinates) at which the image is captured, a location at which the point cloud is captured, etc. In addition, for example, the location associated with the bounding box can include a location computed based on a determined distance between the bounding box and the location at which the image and/or point cloud is captured, which may be based on distance information from the camera 110, LIDAR 114, etc., such as a zoom level, a determined distance within the image between the bounding box and a point of reference, a location (e.g., GPS location) associated with obtaining the image or point cloud, etc. In one example, parking map component 106 can transform between coordinates of the bounding box respective to the point cloud and map coordinates based on a heading direction of the vehicle capturing the images and/or point clouds, which can be determined based on a difference of location of the vehicle at two or more instances of time.

Parking map component 106, in an example, can also apply filtering to filter out false parking spaces. For example, parking map component 106 may determine a trajectory of the vehicle using GPS data, and where a bounding box for a parking space is determined to be in the trajectory, parking map component 106 may remove the bounding box from the parking map. Similarly, parking map component 106 can compare the bounding box size to one or more thresholds to detect false parking spaces, which can be removed if they exceed the one or more thresholds (e.g., 10 meters). Parking map component 106 can also, in one example, apply a mean shift clustering process to the bounding boxes to refine the location on the map based on multiple bounding boxes generated for a given location over time (e.g., by the vehicle or other vehicles traveling the route and generating bounding boxes for the locations). Moreover, in an example, parking map component 106 may generate layer information for including on a map (e.g., as opposed to an entire parking map).

In any case, in an example, parking map component 106 can provide the parking map and/or corresponding layer information to one or more other devices via network 140. For example, parking map component 106 may upload the parking map and/or corresponding layer information to one or more computers via network 140, and other vehicles, personal devices (e.g., cellular phones, tablets, etc.) can download the parking map and/or corresponding layer information for displaying parking spaces on a display of a navigation system, for augmenting or updating the parking map and/or corresponding layer information, etc. As described, repeating method 200 can help to refine the existing bounding boxes, detect additional parking spaces, etc. In one example, a vehicle performing method 200 can use the existing parking map and/or corresponding layer information to detect existing parking spaces in an attempt to refine the bounding boxes. As the camera 110, LIDAR 114, etc. become smaller in size and may be more commonplace, an incremental number of route traversals can be performed to refine the parking map.

Moreover, in an example, other vehicles or devices can utilize the parking map and/or corresponding information to add parking space availability information (e.g., to the parking map and/or as another layer). For example, given the parking map, a vehicle equipped with a camera, LIDAR, or other device can detect whether a known parking space is available or occupied, and can provide the detection to one or more other devices (e.g., one or more computers via a network 140). Similarly, a vehicle can detect (e.g., based on GPS location) that it is occupying or vacating a known parking space (e.g., known based on the parking map), and may provide such information to the one or more other devices. Accordingly, information regarding availability of parking spaces can be provided from the one or more other devices to various vehicles, personal devices, etc., in an attempt to provide real-time parking space availability information. Moreover, as described, as equipment and ability to obtain the parking map becomes more available, more vehicles can report this information more often for more accurate parking space availability information. In other examples, vehicles can travel the route throughout the day for the purpose of reporting parking space availability information for known parking spaces.

Figure 5:
FIG. 5 illustrates an example of an image captured for generating a parking map according to one aspect of the disclosure.
Figure 6:
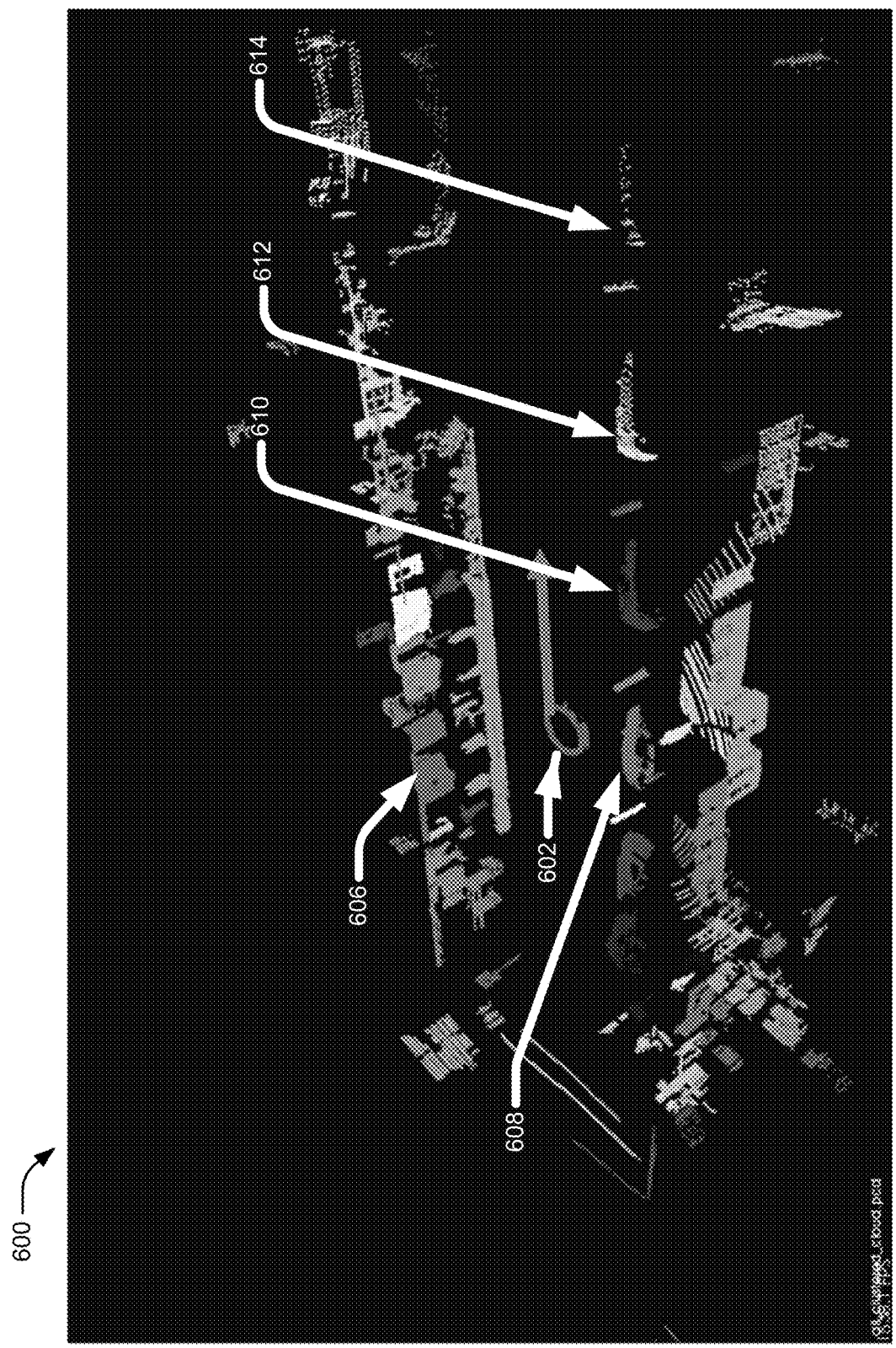
FIG. 6 illustrates an example of a point cloud captured for generating a parking map according to one aspect of the disclosure.

FIGS. 5-11 illustrate examples of images and/or scans in accordance with aspects described above. For example, FIG. 5 illustrates an example of an image 500 captured by a camera 110, where the camera 110 may be mounted on a vehicle 502 traveling a route. The image 500 depicts a scene captured by the camera 110 along the route, and the scene may be associated with a location (e.g., a location of vehicle 502 when the image 500 is captured), as described above. The image 500 includes a street 504, various buildings 506 along the street 504, and a plurality of vehicles 508, 510, 512, 514, 516 parked along the street 504 and/or traveling on the street 504. This image 500 can be provided to the parking map component 106. FIG. 6 illustrates an example of a point cloud 600 obtained from a LIDAR 114, which may also be mounted on the vehicle 602 traveling the route. The point cloud 600 depicts a LIDAR scan captured by the LIDAR 114 along the route, and may also be associated with the location of the image 500 based on a time at which the image 500 and point cloud 600 are captured, a location of the vehicle when the point cloud 600 is captured, etc. The point cloud 600 includes a plurality of points that define one or more buildings 606, and a plurality of vehicles 608, 610, 612, 614 (which may be one or more of the vehicles 508, 510, 512, 514 in the image 500). This point cloud 600 can be provided to the parking map component 106 as well.

Figure 7:
FIG. 7 illustrates an example of a semantic predicted image created from a captured image for generating a parking map according to one aspect of the disclosure.

In an example, object clustering component 120 can apply a dilated CNN to the image 500 (e.g., as in block 302 in FIG. 3) to yield a semantic predicted image with pixel values set for a semantic prediction of objects in the image. FIG. 7 illustrates an example of a semantic predicted image 700 generated from image 500. For example, object clustering component 120 can detect the street 504 in image 500, and modify pixel values of pixels identified as the street 504 to be of one color, to yield street 704 in the semantic predicted image 700. Similarly, object clustering component 120 can detect the buildings 506 in image 500, and modify pixel values of pixels identified as the buildings 506 to be of one color, to yield buildings 706 in the semantic predicted image 700. Moreover, for example, object clustering component 120 can detect the vehicles 508, 510, 512, 514, 516 in image 500, and modify pixel values of pixels identified as a vehicle to be of one color, to yield vehicles 708 in the semantic predicted image 700. As described, objects identified in the same semantic class (e.g., vehicle) can be modified to be of the same color, and thus instance-level segmentation may not be provided by the object clustering component 120 in applying the dilated CNN.

Figure 8:
FIG. 8 illustrates an example of an image having associated points from a point cloud for generating a parking map according to one aspect of the disclosure.

Additionally, in an example, object clustering component 120 can associate points in the point cloud 600 to at least portions of pixels associated with semantic predictions of semantic predicted image 700 (e.g., as in block 304 in FIG. 3). An example of the association is shown in FIG. 8, which illustrates an image 800 of an example of semantic object clusters. In an example, object clustering component 120 can associate points of vehicle 608 in the point cloud 600 with a vehicle 708 of the semantic predicted image 700 to generate a semantic object cluster representing a vehicle 808. In one example, as described, object clustering component 120 can associate a location of the image 500 (and thus image 700) with a location of point cloud 600, can determine locations of specific semantic predicted objects in the semantic predicted image 700 (e.g., based on a location associated with the image and distance, angle, etc., to the objects from a point of reference) and corresponding locations of the points in the point cloud 600, and/or the like. In any case, image 800 can include some association of semantic predicted objects to corresponding points in the point cloud 600, and image 800 includes various clusters of points of vehicles 808, 810, 812 associated with objects in image 700 (and thus image 500), such as buildings 706 (and 506), and vehicles 708 (and 508), 710 (and 510), and 712 (and 512), respectively. As described above, the association may include applying a calibration matrix, transferring semantic predictions into the front view of the point cloud, using a Euclidean clustering, etc. Accordingly, semantic object classifications determined from the image 500 using a dilated CNN can be associated with the points of vehicles 808, 810, 812 for further refining the semantic object classification determination.

In this example, cluster classifying component 122 can, for one or more (or each) of the object clusters, apply a 3D CNN to a given object cluster in the 3D, such as to points of vehicles 608, 610, 612, 614, to refine classification of the object clusters. For example, cluster classifying component 122 can apply the 3D CNN to point clouds determined as corresponding to vehicles based on the point clouds associated with the semantic predicted objects of the vehicle classification (e.g., points of vehicles 608, 610, 612, 614, as described above). As described, for example, cluster classifying component 122 can apply a plurality of layers (e.g., a convolutional layer, pooling layer, fully connected layer, etc.) to the object clusters to determine a shape prediction for the object clusters. Cluster classifying component 122 can then apply a linear weight vector to the semantic prediction and shape prediction to determine the object classification for the object clusters associated with vehicles 808, 810, 812, as being vehicles.

Figure 9:
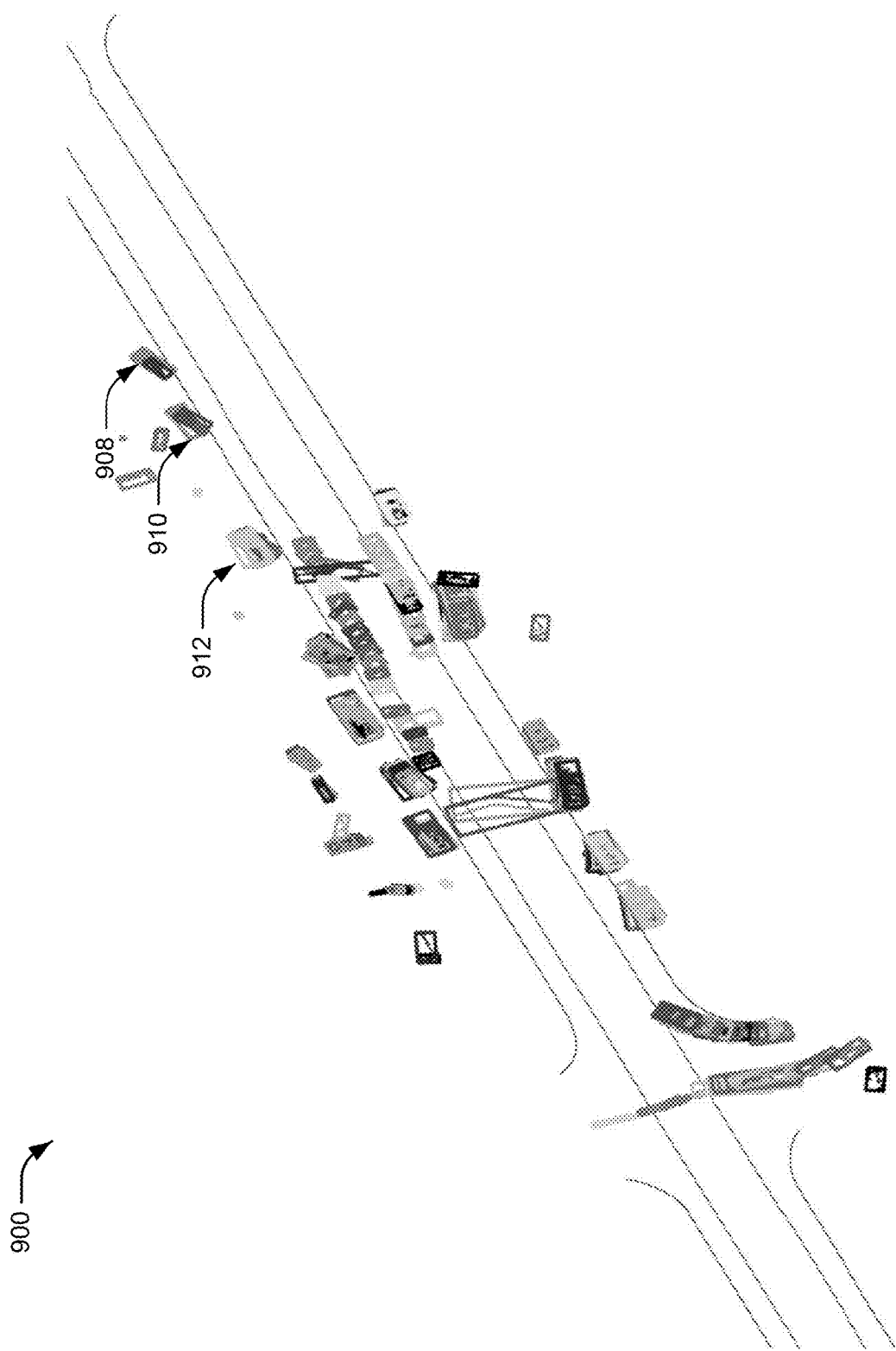
FIG. 9 illustrates an example of a parking map with a plurality of bounding boxes determined based on image and point cloud data according to one aspect of the disclosure.

FIG. 9 illustrates an example of a plurality of bounding boxes displayed on a map 900. The plurality of bounding boxes can correlate to locations at which a plurality of object clusters are detected, as described above. For example, bounding box generating component 124 can generate the bounding boxes based on ignoring height of the object clusters detected in the point cloud 600 and projecting the points in an x-y plane. Thus, for example, map 900 may include bounding boxes for detected vehicles 908, 910, 912, which may correspond, for example, to vehicles 608, 610, 612 in the point cloud 600, and other detected vehicles (e.g., from additional image capture via camera 110, point cloud capture via LIDAR 114, etc.). Bounding box generating component 124 can generate the bounding box using a rotating calipers process to find a minimum area oriented rectangle enclosing the points representing the vehicles. Parking map component 106 can project the bounding boxes onto the map 900 based on the location data (e.g., GPS coordinates) associated with the bounding boxes (e.g., with the image 500, point cloud 600, etc. as captured via the vehicle).

Figure 10:
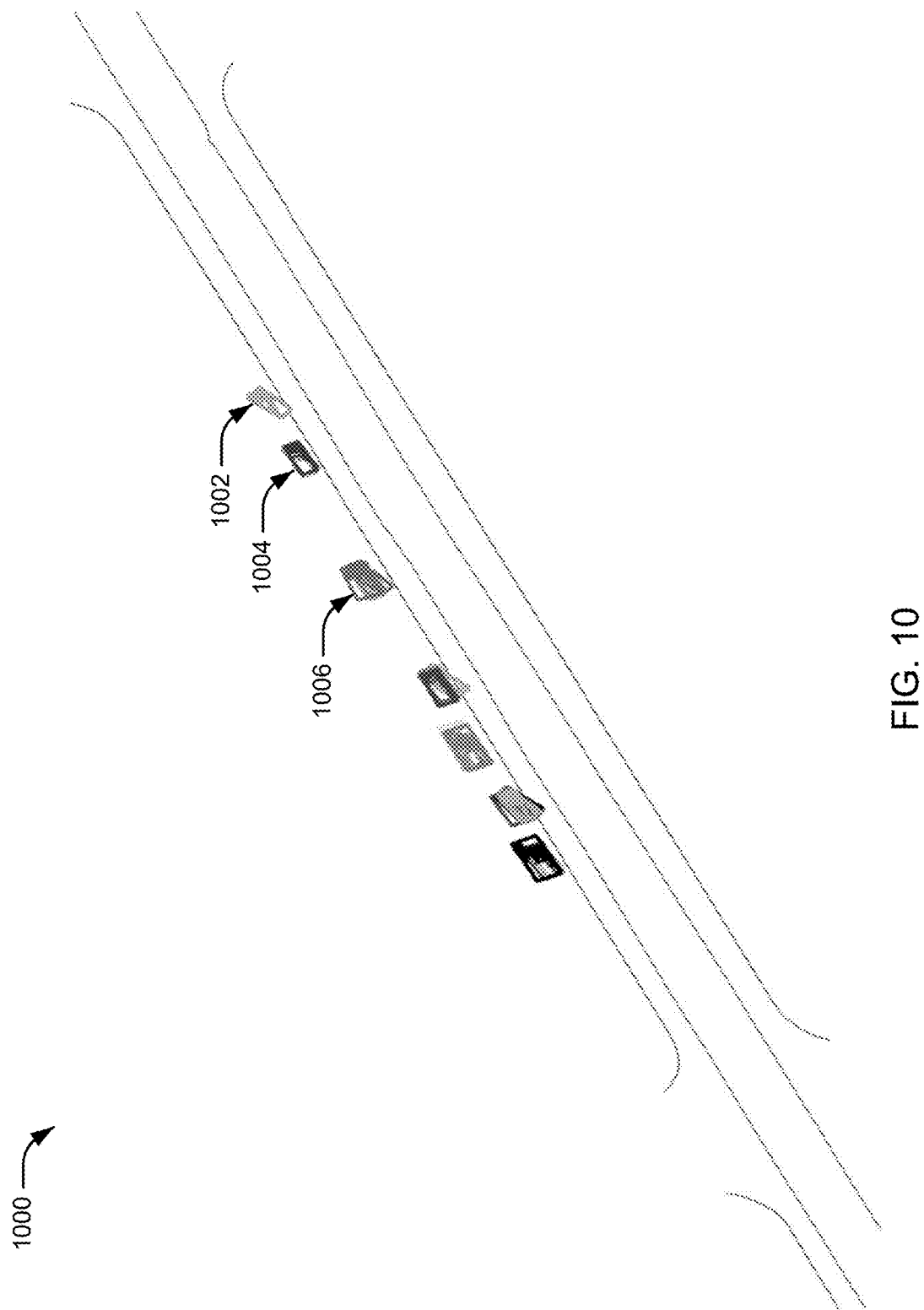
FIG. 10 illustrates an example of a parking map with a plurality of bounding boxes filtered to remove certain bounding boxes according to one aspect of the disclosure.

Additionally, for example, parking map component 106 may filter the map 900 to remove bounding boxes based on one or more conditions, such as the bounding box being on the street or on a building, among other conditions. FIG. 10 illustrates a filtered map 1000 filtered from map 900, and including bounding boxes for vehicles 1002, 1004, 1006, which may correspond to the bounding boxes for vehicles 902, 904, 906, while filtering other bounding boxes (e.g., bounding boxes on the street, which can be determined based on determining a trajectory of the vehicle obtaining the images, point clouds, etc., and determining the bounding boxes are in the trajectory). Parking map component 106 may filter out other bounding boxes based on a total area or other size of the bounding box achieving a threshold.

Figure 11:
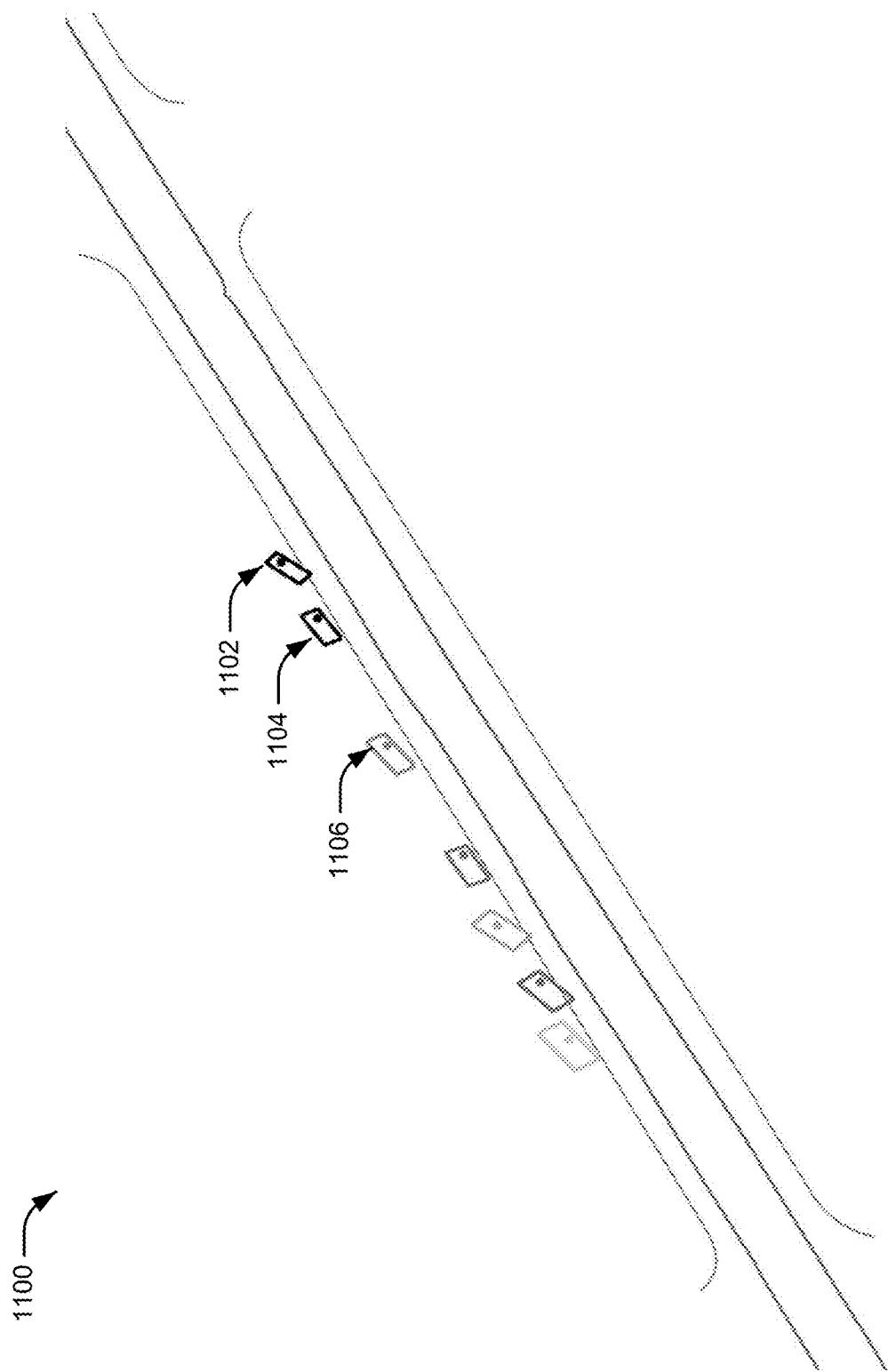
FIG. 11 illustrates an example of a parking map with a plurality of means shift clustered bounding boxes according to one aspect of the disclosure.

Moreover, in an example, parking map component 106 can apply mean shift clustering, as described, which can generate map 1100 in FIG. 11. For example, parking map component 106 can average bounding box information over a plurality of bounding boxes generate for a given parking space, which can result in bounding boxes for vehicles 1102, 1104, 1106, which can be more refined than bounding boxes for vehicles 1102, 1104, 1106.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 1200 is shown in FIG. 12.

Figure 12:
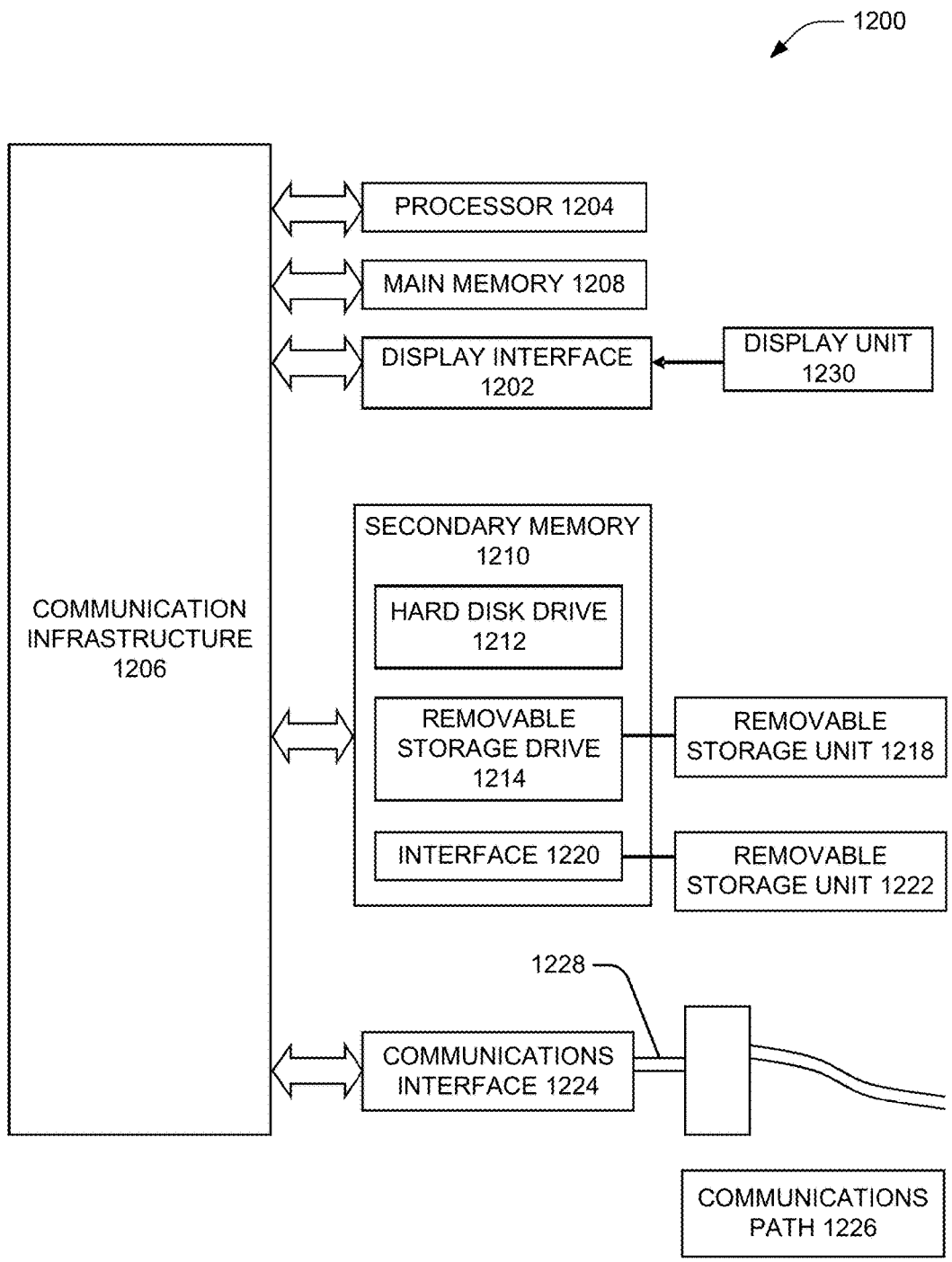
FIG. 12 presents an example system diagram of various hardware components and other features according to one aspect of the disclosure.

FIG. 12 presents an example system diagram of various hardware components and other features, for use in accordance with an aspect of the present disclosure. Computer system 1200 includes one or more processors, such as processor 1204. The processor 1204 is connected to a communication infrastructure 1206 (e.g., a communications bus, cross-over bar, or network). In one example, processor 102 can include processor 1204. Various software aspects are described in terms of this example computer system. After reading this description, it will become apparent to a person skilled in the relevant art(s) how to implement aspects described herein using other computer systems and/or architectures.

Computer system 1200 can include a display interface 1202 that forwards graphics, text, and other data from the communication infrastructure 1206 (or from a frame buffer not shown) for display on a display unit 1230. Computer system 1200 also includes a main memory 1208, preferably random access memory (RAM), and can also include a secondary memory 1210. The secondary memory 1210 can include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1218 in a well-known manner. Removable storage unit 1218, represents a floppy disk, magnetic tape, optical disk, etc., which is read by and written to removable storage drive 1214. As will be appreciated, the removable storage unit 1218 includes a computer usable storage medium having stored therein computer software and/or data.

In alternative aspects, secondary memory 1210 can include other similar devices for allowing computer programs or other instructions to be loaded into computer system 1200. Such devices can include, for example, a removable storage unit 1222 and an interface 1220. Examples of such can include a program cartridge and cartridge interface (such as that found in video game devices), a removable memory chip (such as an erasable programmable read only memory (EPROM), or programmable read only memory (PROM)) and associated socket, and other removable storage units 1222 and interfaces 1220, which allow software and data to be transferred from the removable storage unit 1222 to computer system 1200. In an example, memory 104 can include one or more of main memory 1208, secondary memory 1210, removable storage drive 1214, removable storage unit 1218, removable storage unit 1222, etc.

Computer system 1200 can also include a communications interface 1224. Communications interface 1224 allows software and data to be transferred between computer system 1200 and external devices. Examples of communications interface 1224 can include a modem, a network interface (such as an Ethernet card), a communications port, a Personal Computer Memory Card International Association (PCMCIA) slot and card, etc. Software and data transferred via communications interface 1224 are in the form of signals 1228, which can be electronic, electromagnetic, optical or other signals capable of being received by communications interface 1224. These signals 1228 are provided to communications interface 1224 via a communications path (e.g., channel) 1226. This path 1226 carries signals 1228 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1280, a hard disk installed in hard disk drive 1270, and signals 1228. These computer program products provide software to the computer system 1200. Aspects described herein can be directed to such computer program products.

Computer programs (also referred to as computer control logic) are stored in main memory 1208 and/or secondary memory 1210. Computer programs can also be received via communications interface 1224. Such computer programs, when executed, enable the computer system 1200 to perform various features in accordance with aspects described herein. In particular, the computer programs, when executed, enable the processor 1204 to perform such features. Accordingly, such computer programs represent controllers of the computer system 1200. Computer programs can include parking map component 106, image component 108 for receiving images from one or more cameras 110, point cloud component 112 for receiving point clouds, location component 116 for determining location of one or more entities associated with the processor 1204, etc., as described herein.

In variations where aspects described herein are implemented using software, the software can be stored in a computer program product and loaded into computer system 1200 using removable storage drive 1214, hard disk drive 1212, or communications interface 1220. The control logic (software), when executed by the processor 1204, causes the processor 1204 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 13:
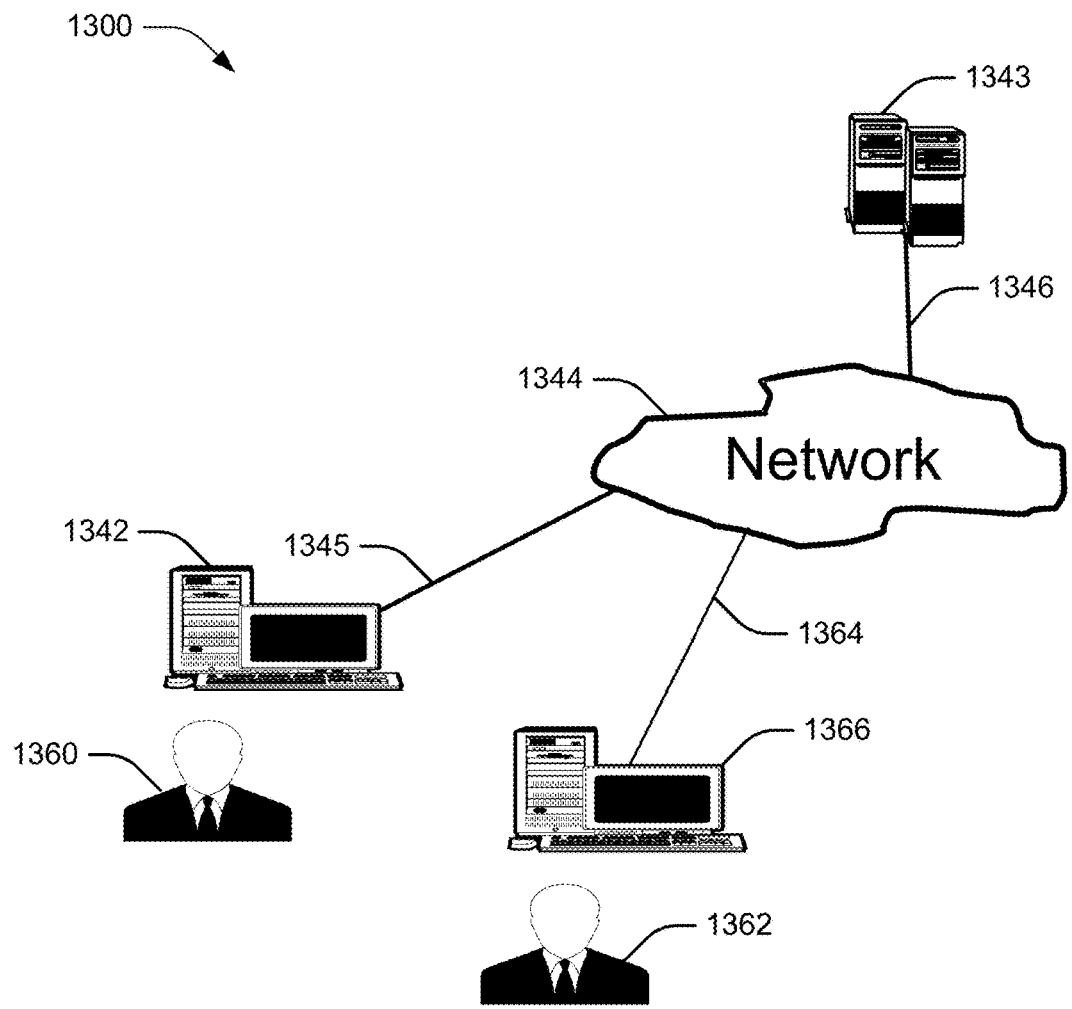
FIG. 13 is a block diagram of various example system components according to one aspect of the disclosure.

FIG. 13 is a block diagram of various example system components, in accordance with an aspect. FIG. 13 shows a communication system 1300 usable in accordance with aspects described herein. The communication system 1300 includes one or more accessors 1360, 1362 (also referred to interchangeably herein as one or more "users") and one or more terminals 1342, 1366. For example, terminals 1342, 1366 can be computing devices that may include a processor (e.g., processor 102), memory (e.g., memory 104). In one aspect, data for use in accordance with aspects described herein is, for example, input and/or accessed by accessors 1360, 1362 via terminals 1342, 1366, such as personal computers (PCs), minicomputers, mainframe computers, microcomputers, telephonic devices, or wireless devices, such as personal digital assistants ("PDAs") or a hand-held wireless devices coupled to a server 1343, such as a PC, minicomputer, mainframe computer, microcomputer, or other device having a processor and a repository for data and/or connection to a repository for data, via, for example, a network 1344, such as the Internet or an intranet, and couplings 1345, 1346, 1364. The couplings 1345, 1346, 1364 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for generating a parking map, comprising:
obtaining, via a camera, an image acquired at a location;
obtaining, via a light detector, a point cloud acquired at a second location, which is within a threshold distance of the location;
determining a plurality of object clusters based at least in part on associating pixels from the image with points from the point cloud, wherein determining the plurality of object clusters comprises:
applying a dilated convolutional semantic segmentation neural network to the image to associate at least a portion of the pixels with one or more semantic predictions, wherein associating the pixels from the image with the points from the point cloud comprises associating at least a portion of the points that correspond to at least the portion of the pixels with the associated one or more semantic predictions; and
determining the plurality of object clusters by grouping the plurality of object clusters based at least in part on the associated one or more semantic predictions;
classifying at least a portion of the plurality of object clusters into one of a plurality of object classifications including at least a vehicle object classification;
generating a bounding box for one or more of the plurality of object clusters classified as the vehicle object classification; and
including the bounding box as a parking space on a parking map based on at least one of the location or the second location.

2. The method of claim 1, wherein determining the plurality of object clusters is further based on determining a Euclidean distance between points corresponding to a given one of the one or more semantic predictions.

3. The method of claim 1, wherein classifying at least the portion of the plurality of object clusters comprises applying a three-dimensional (3D) convolutional neural network (CNN) to the plurality of object clusters to determine the one of the plurality of object classifications.

4. The method of claim 3, further comprising transforming at least one of the plurality of object clusters to an occupancy grid, wherein applying the 3D CNN comprises applying the 3D CNN to the occupancy grid to obtain a category probability for the at least one of the plurality of object clusters.

5. The method of claim 4, wherein classifying at least the portion of the plurality of object clusters is based at least in part on combining the category probability and one or more semantic predictions for a given one of the portion of the plurality of object clusters.

6. The method of claim 1, wherein generating the bounding box comprises applying a rotating calipers process to the one or more of the plurality of object clusters classified as the vehicle object classification to determine coordinates of the bounding box around the one or more of the plurality of object clusters.

7. The method of claim 1, wherein generating the bounding box further comprises determining that the bounding box is not in a trajectory based on location data.

8. The method of claim 1, wherein including the bounding box as the parking space on the parking map comprises at least one of displaying the bounding box as the parking space on the parking map using a display of a vehicle, or providing metadata of a parking space location to a parking map application based on a location of the bounding box.

9. A vehicle comprising:
a camera for capturing one or more images;
a light detector for capturing one or more point clouds;
a memory coupled to the camera and the light detector for storing the one or more images and the one or more point clouds; and
at least one processor coupled to the memory, wherein the at least one processor is configured to:
obtain, via the camera, an image acquired at a location;
obtain, via the light detector, a point cloud acquired at a second location, which is within a threshold distance of the location;
determine a plurality of object clusters based at least in part on associating pixels from the image with points from the point cloud and at least in part by:
applying a dilated convolutional semantic segmentation neural network to the image to associate at least a portion of the pixels with one or more semantic predictions, wherein associating the pixels from the image with the points from the point cloud comprises associating at least a portion of the points that correspond to at least the portion of the pixels with the associated one or more semantic predictions; and
determining the plurality of object clusters by grouping the plurality of object clusters based at least in part on the associated one or more semantic predictions;
classify at least a portion of the plurality of object clusters into one of a plurality of object classifications including at least a vehicle object classification;
generate a bounding box for one or more of the plurality of object clusters classified as the vehicle object classification; and
include the bounding box as a parking space on a parking map based on at least one of the location or the second location.

10. The vehicle of claim 9, wherein the at least one processor is configured to determine the plurality of object clusters further based on determining a Euclidean distance between points corresponding to a given one of the one or more semantic predictions.

11. The vehicle of claim 9, wherein the at least one processor is configured to classify at least the portion of the plurality of object clusters at least in part by applying a three-dimensional (3D) convolutional neural network (CNN) to the plurality of object clusters to determine the one of the plurality of object classifications.

12. The vehicle of claim 11, wherein the at least one processor is further configured to transform at least one of the plurality of object clusters to an occupancy grid, wherein the at least one processor is configured to apply the 3D CNN to the occupancy grid to obtain a category probability for the at least one of the plurality of object clusters.

13. The vehicle of claim 12, wherein the at least one processor is configured to classify at least the portion of the plurality of object clusters based at least in part on combining the category probability and one or more semantic predictions for a given one of the portion of the plurality of object clusters.

14. The vehicle of claim 9, wherein the at least one processor is configured to generate the bounding box at least in part by applying a rotating calipers process to the one or more of the plurality of object clusters classified as the vehicle object classification to determine coordinates of the bounding box around the one or more of the plurality of object clusters.

15. The vehicle of claim 9, wherein the at least one processor is configured to generate the bounding box at least in part by determining that the bounding box is not in a trajectory based on location data.

16. The vehicle of claim 9, wherein the at least one processor is configured to include the bounding box as the parking space on the parking map by at least one of displaying the bounding box as the parking space on the parking map using a display of the vehicle, or providing metadata of a parking space location to a parking map application based on a location of the bounding box.

17. A non-transitory computer-readable medium storing computer executable code for generating a parking map, comprising code for:
  obtaining, via a camera, an image acquired at a location;
  obtaining, via a light detector, a point cloud acquired at a second location, which is within a threshold distance of the location;
  determining a plurality of object clusters based at least in part on associating pixels from the image with points from the point cloud, wherein the code for determining the plurality of object clusters comprises code for:
    applying a dilated convolutional layer to the image to associate at least a portion of the pixels with one or more semantic predictions, wherein associating the pixels from the image with the points from the point cloud comprises associating at least a portion of the points that correspond to at least the portion of the pixels with the associated one or more semantic predictions; and
    determining the plurality of object clusters by grouping the plurality of object clusters based at least in part on the associated one or more semantic predictions;
  classifying at least a portion of the plurality of object clusters into one of a plurality of object classifications including at least a vehicle object classification;
  generating a bounding box for one or more of the plurality of object clusters classified as the vehicle object classification; and
  including the bounding box as a parking space on a parking map based on at least one of the location or the second location.

18. The non-transitory computer-readable medium of claim 17, wherein the code for determining the plurality of object clusters further comprises code for determining a Euclidean distance between points corresponding to a given one of the one or more semantic predictions.

* * * * *